(12) United States Patent
Lim et al.

(10) Patent No.: US 10,156,638 B2
(45) Date of Patent: Dec. 18, 2018

(54) METHOD AND A SYSTEM FOR PROVIDING AN INTERACTIVE LOCATION SERVICE

(71) Applicant: CENTRE FOR CONTENT CREATION SDN BHD, Cyberjaya, Selangor (MY)

(72) Inventors: Kok Wing Jr Lim, Selangor (MY); Mehdi Zarrabi Esfahani, Selangor (MY); Anas Firdaus Bin Ahmad Basri, Kedah (MY); Zain Bin Kafeel, Wilayah Persekutuan Kuala Lumpur (MY)

(73) Assignee: CENTRE FOR CONTENT CREATION SDN BHD, Cyberjaya (MY)

( * ) Notice: Subject to any disclaimer, the term of this patent is extended or adjusted under 35 U.S.C. 154(b) by 322 days.

(21) Appl. No.: 15/260,308

(22) Filed: Sep. 8, 2016

(65) Prior Publication Data
US 2017/0363748 A1 Dec. 21, 2017

(30) Foreign Application Priority Data
Jun. 20, 2016 (MY) ................................ 2016702281

(51) Int. Cl.
| | | |
|---|---|---|
| *G01S 19/26* | (2010.01) | |
| *G01S 19/03* | (2010.01) | |
| *G01S 5/02* | (2010.01) | |
| *H04L 29/06* | (2006.01) | |
| *H04L 29/08* | (2006.01) | |

(52) U.S. Cl.
CPC ............ *G01S 19/26* (2013.01); *G01S 5/0263* (2013.01); *H04L 63/083* (2013.01); *H04L 63/107* (2013.01); *H04L 67/18* (2013.01)

(58) Field of Classification Search
CPC .............................. G01S 5/0263; G01S 19/26
USPC ................ 342/357.2, 357.25, 357.4, 357.65; 701/468, 469
See application file for complete search history.

(56) References Cited

U.S. PATENT DOCUMENTS

| | | | |
|---|---|---|---|
| 2007/0229545 A1* | 10/2007 | Bowman ............. | G01C 21/367 345/647 |
| 2010/0182145 A1* | 7/2010 | Ungari ................... | G09B 29/10 340/539.13 |
| 2013/0050260 A1* | 2/2013 | Reitan ..................... | G06F 3/011 345/633 |

* cited by examiner

*Primary Examiner* — Dao L Phan

(57) ABSTRACT

The present invention provides a method (200) for providing an interactive location service to a user, through a computing device (110). The method comprising the steps of obtaining (210) a spherical map of the geographical region, identifying (220) a point of reference within the geographical region, obtaining (230) reference Global Positioning System (GPS) coordinates corresponding to the point of reference, defining (240) a spatial coordinate system with the point of reference as an origin of the spatial coordinate system, identifying (250) a first locale within the geographical region and obtaining first GPS coordinates, calculating (260) first spatial coordinates, displaying (270) the spherical map at a screen (120), indicating (280) the first locale on the spherical map by means of a first token and displaying (290) content data corresponding to the first locale to the user. Further, a system (400) for providing an interactive location service to a user is provided.

18 Claims, 11 Drawing Sheets

METHOD AND A SYSTEM FOR PROVIDING AN INTERACTIVE LOCATION SERVICE

CROSS-REFERENCE TO RELATED APPLICATIONS

This present application claims the benefit of Malaysian Patent Application No. PI 2016702281 filed on Jun. 20, 2016, the contents of which are hereby incorporated by reference.

TECHNICAL FIELD

Embodiments of the present invention relate to information and communication technologies and more particularly, to a method and a system for providing an interactive location service to a user, which is relatively more efficient and less error prone.

BACKGROUND ART

There are pluralities of websites on the World Wide Web offering location services. Some of the websites from the plurality of websites allow a user to view information related to a locale within a particular geographical region. Other websites from the plurality of web sites, such as social networking platforms allow sharing of the information related to the locale, while a few other websites from the plurality of websites may allow purchase of specific services within the geographical region.

For example, a user wishes to visit the geographical region, he or she will have to make use of more than one website to plan an itinerary in entirety. The user may view information regarding tourist attractions in the geographical region, in one website. Then share the information with friends on other website. And then purchase tickets for the tourist attractions from one or more other websites. In another example, the user may want to visit a hospital for an ailment. He/she may view information regarding the hospital, such as an address and reviews, on one website and book an appointment through another website. Shuffling between more than one websites causes distress, inefficiencies and errors to creep into the entire process. Further, content displayed at the plurality of websites is limited and offers minimal information about the services being sought. In a case where the user wishes to view additional information about the service, the user will have to seek additional information from another website or resource. Also, the content being displayed is static and non-interactive in nature.

Also, there are a number of algorithms available on the internet, which allows a geographical region to be displayed in a spherical map form. However, such spherical maps suffer from a plurality of discrepancies. For example, the plurality of locales can only be identified using the tags provided within the spherical map. It may not be possible to identify each and every locale within the geographical region that may be of an interest to the user during the generation of the spherical map. Therefore, there is a possibility that the user may fail to locate the locale of his/her interest. Also, it is not possible to obtain additional information such as distance between two locales or time taken for transit between the two locales.

Accordingly, there remains a need in the prior art to have a method and a system for providing an interactive location service to a user that overcomes the aforesaid problems and shortcomings.

However, there remains a need in the art for an improved method and a system for providing an interactive location service to a user that offers centralization of data and is relatively more efficient and less error prone.

SUMMARY OF THE INVENTION

Embodiments of the present invention aim to provide a method and a system for providing an interactive location service to a user. The present invention enhances the location service experience to the user by integrating other technologies to create an intelligent platform and GPS location mapping with high resolution spherical images. Further, the proposed method and system offers centralization of data and relatively more efficient and less error prone.

In accordance with an embodiment of the present invention, a method of providing an interactive location service to a user through a computing device, comprises the steps of obtaining a spherical map of a geographical region, identifying a point of reference within the geographical region, from the spherical map, obtaining reference Global Positioning System (GPS) coordinates corresponding to the point of reference, defining a spatial coordinate system with the point of reference as an origin of the spatial coordinate system, identifying a first locale within the geographical region and obtaining first GPS coordinates corresponding to the first locale, calculating first spatial coordinates corresponding to the first locale as a function of the reference GPS coordinates, the first GPS coordinates and the spatial coordinate system, displaying the spherical map at a screen of the computing device, indicating the first locale on the spherical map at the screen of the computing device, by means of a first token and displaying content data corresponding to the first locale to the user, on selection of the first token.

In accordance with an embodiment of the present invention, the content data comprises at least one of a plurality of two dimensional images, a plurality of spherical images, a plurality of videos and data in textual form.

In accordance with an embodiment of the present invention, the content data is in accordance with the first GPS coordinates corresponding to the first locale.

In accordance with an embodiment of the present invention, the method further comprises the step of receiving input data from the user and modifying the content data as a function of the input data.

In accordance with an embodiment of the present invention, the method further comprises the step of displaying the content data along with the first locale on a two dimensional map provided by a map server.

In accordance with an embodiment of the present invention, the method further comprises the step of providing the content data through a social media platform to one or more second users.

In accordance with an embodiment of the present invention, the method further comprises the step of receiving one or more authentication credentials from the user, wherein the content data is regulated on the basis of the one or more authentication credentials.

In accordance with an embodiment of the present invention, the one or more authentication credentials comprise at least one of a user identifier and a password.

In accordance with an embodiment of the present invention, the method further comprises the step of providing an e-commerce medium on selection of the first token.

In accordance with an embodiment of the present invention, the method further comprises the steps of receiving second GPS coordinates corresponding to a second locale from the user, calculating second spatial coordinates corresponding to the second locale as a function of the reference GPS coordinates, the second GPS coordinates and the spatial coordinate system and indicating the second locale on the spherical map at the screen of the computing device, by means of a second token.

In accordance with an embodiment of the present invention, a system for providing an interactive location service to a user through a computing device comprises an interface module, a data processing module and a database. Further, the interface module if configured to obtain a spherical map of a geographical region, display the spherical map at a screen of a computing device, indicate a first locale on the spherical map at the screen of the computing device, by means of a first token and display content data corresponding to the first locale to the user, on selection of the first token. Further, the data processing module is configured to identify a point of reference within the geographical region, from the spherical map, obtain reference Global Positioning System (GPS) coordinates corresponding to the point of reference, define a spatial coordinate system with the point of reference as an origin of the spatial coordinate system, identify the first locale within the geographical region and obtain first GPS coordinates corresponding to the first locale and calculate first spatial coordinates corresponding to the first locale as a function of the reference GPS coordinates, the first GPS coordinates and the spatial coordinate system. Also, the database in configured to store the reference GPS coordinates, the first GPS coordinates, the first spatial coordinates and the content data.

In accordance with an embodiment of the present invention, the interface module is further configured to receive input data from the user and the data processing module is further configured to modify the content data as a function of the input data.

In accordance with an embodiment of the present invention, the interface module is further configured to display the content data along with the first locale on a two dimensional map provided by a map server.

In accordance with an embodiment of the present invention, the interface module is further configured to provide the content data through a social media platform to one or more second users.

In accordance with an embodiment of the present invention, the system further comprises an administration module configured to regulate the content data on the basis of one or more authentication credentials of the user, wherein the interface module is further configured to receive the one or more authentication credentials from the user and the database is further configured to store the one or more authentication credentials.

In accordance with an embodiment of the present invention, wherein the one or more authentication credentials comprise at least one of a user identifier and a password.

In accordance with an embodiment of the present invention, the interface module is further configured to provide an e-commerce medium on selection of the first token.

In accordance with an embodiment of the present invention, the interface module is further configured to receive second GPS coordinates corresponding to a second locale from the user and indicate the second locale on the spherical map at the screen of the computing device, by means of a second token. Further, the data processing module is further configured to calculate second spatial coordinates corresponding to the second locale as a function of the reference GPS coordinates, the second GPS coordinates and the spatial coordinate system. Also, the database is further configured to store the second spatial coordinates.

BRIEF DESCRIPTION OF THE ACCOMPANYING DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawing illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE PREFERRED EMBODIMENTS

Figure 1:
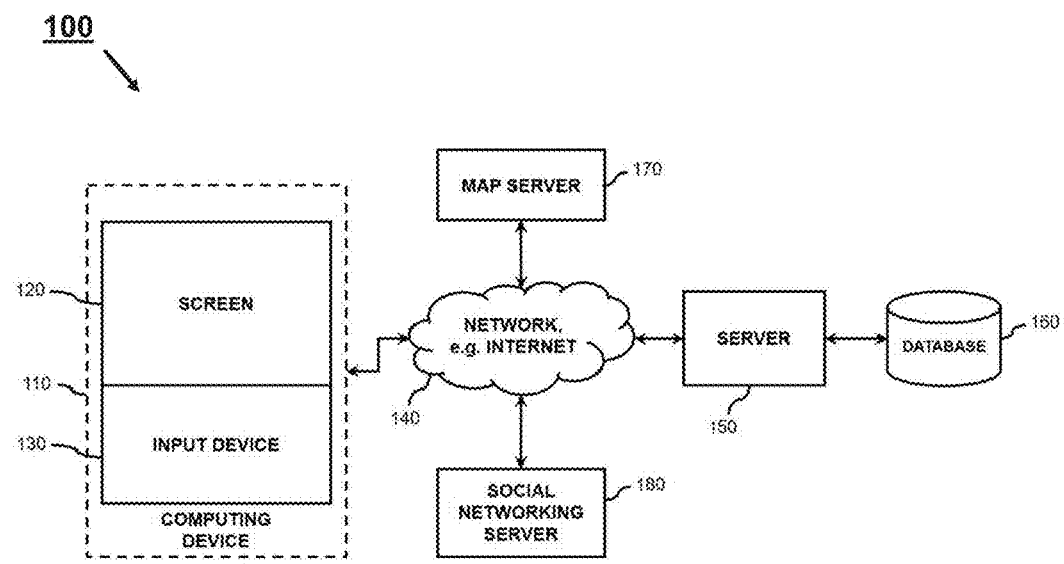
FIG. 1 illustrates a top level diagram of a system of computing devices to which various embodiments described herein may be implemented.

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

Referring to the drawings, the invention will now be described in more detail. FIG. 1 illustrates a top level diagram of a system (100) of computing devices to which various embodiment of the present invention may be implemented. As shown in the FIG. 1, a computing device (110) is connected to a network (140). Further, the computing device (110) comprises a screen (120) and an input device (130). Preferably, the network (140) is internet. However, in various embodiments, the network (140) is a local network implemented through Ethernet and/or Wi-Fi protocols.

Further, a server (150) is connected to the network (140). In accordance with an embodiment, the server (150) is a web server, capable of receiving Hyper Text Transfer Protocol (HTTP) requests in Hypertext Mark-up Language (HTML) or other equivalent languages. The server (150) in turn is operably connected to a database (160). In accordance with an embodiment, the database (160) is configured to process queries in a plurality of languages comprising, but not limited to, SQL, .QL and Datalog etc. In accordance with an embodiment, the database (160) is a cloud based database. In accordance with another embodiment, the database (160) is a local database hosted at a local network.

Further, a map server (170) is connected to the network (140). In accordance with an embodiment, the map server is configured to store satellite maps, in two dimensional format, of a plurality of geographical regions. Further, the map server (170) is also configured to store GPS coordinates of a plurality of locales falling within the plurality of geographical regions. Also, a social networking server (180) is also connected to the network (180). The social networking server (180) is configured to host a plurality of data shared from the server (150) with the social networking server (180).

Figure 2:
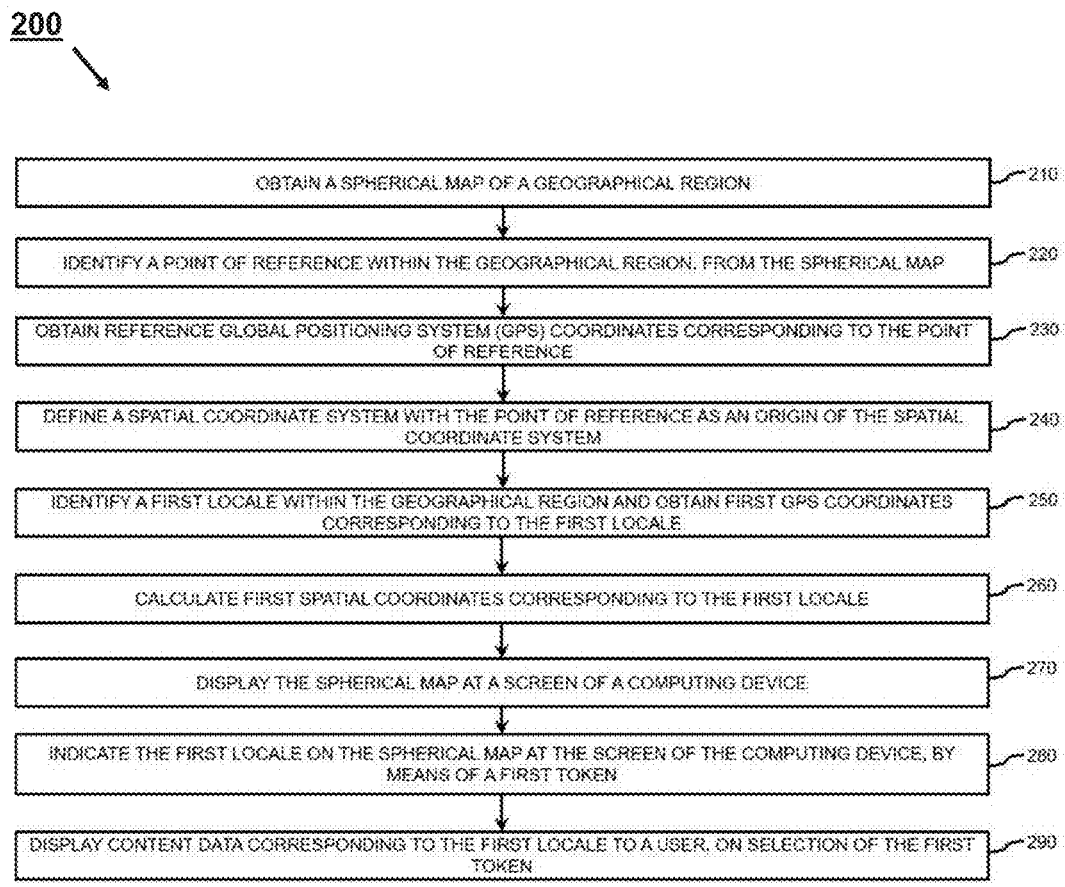
FIG. 2 is a process flow diagram illustrating a method for providing an interactive location service to a user in accordance with an embodiment of the present invention.

FIG. 2 illustrates the method (200) for providing an interactive location service to a user in accordance with an embodiment of the present invention.

The method begins at step 210, by obtaining a spherical map of a geographical region at the server (150). In accordance with an embodiment, the spherical map is obtained through the network (140). Further, the spherical map is obtained from, but not limited to, a plurality of HTML/WebGL libraries.

In accordance with another embodiment, a plurality of two dimensional images corresponding to the geographical region is obtained at the server (150). The plurality of two dimensional images is then stitched to obtain the spherical map. Preferably, the plurality of two dimensional images is obtained from a camera device. Alternately, the plurality of two dimensional images are obtained from the map server (170), and captured at varying altitudes and/or resolutions etc. The plurality of two dimensional images are then stitched together to obtain the spherical map. In any case, the spherical map is stored in the database (160) from the server (150).

At step 220, a point of reference within the geographical region is identified, at the server (150), from the spherical map. In accordance with an embodiment, the point of reference is a position at which the camera device is placed for taking the plurality of two dimensional images of the geographical region.

At step 230, reference Global Positioning System (GPS) coordinates corresponding to the point of reference are obtained from the map server (170). The reference GPS coordinates are obtained at the server (150) and stored in the database (160). The reference GPS coordinates comprise a longitude value and a latitude value corresponding to the point of reference.

At step 240, a spatial coordinate system (300) is defined, at the server (150), with the point of reference as an origin of the spatial coordinate system (300). A plurality of attributes corresponding to the spatial coordinate system (300) are then stored in the database (160) from the server (150).

Figure 3:
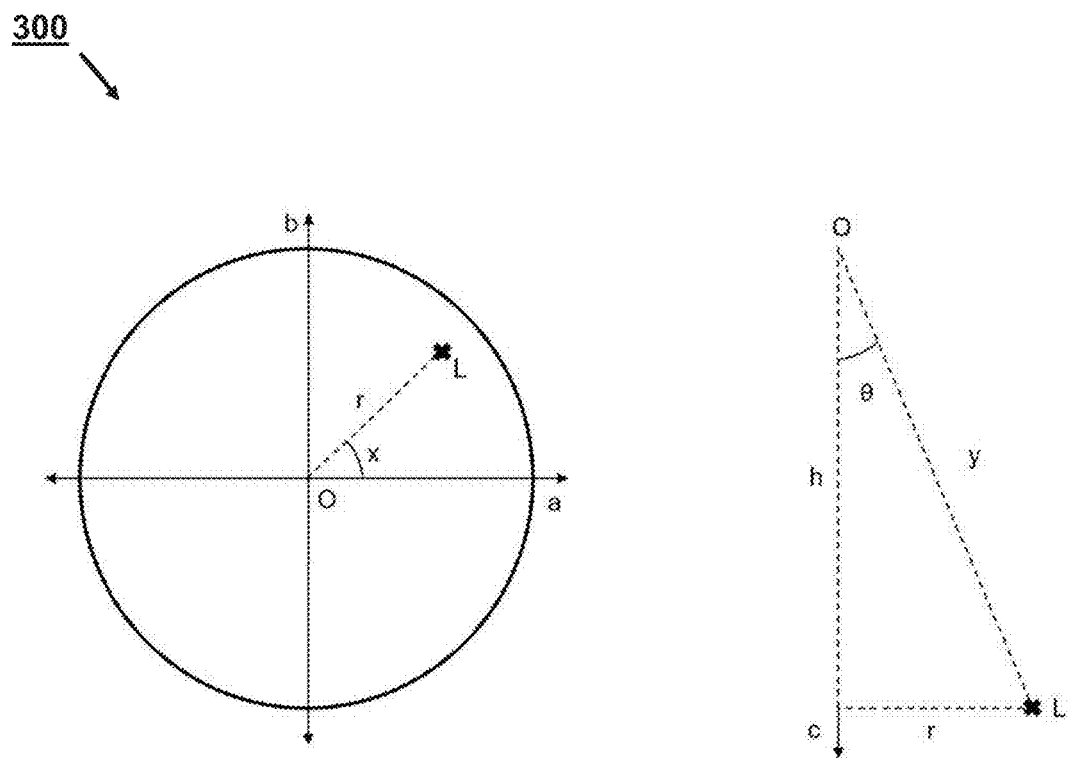
FIG. 3 illustrates a spatial coordinates system with a point of reference as an origin of the spatial coordinate system, in accordance with an embodiment of the present invention.

FIG. 3 illustrates a spatial coordinates system (300) with the point of reference as the origin of the spatial coordinate system, in accordance with an embodiment of the present invention.

The point of reference is denoted by a point 'O'. The point 'O' is assumed to be the centre of the geographical region defined by the spherical map. A set of orthogonal axes 'a', 'b' and 'c' pass through 'O'. A random locale within the geographical region is denoted by letter 'L'. Further, 'x' denotes an angular displacement of the locale 'L' from axis 'a' and acts as a first coordinate. Further, 'h' denotes the height of the camera device from the locale 'L' along axis 'c'. Also, 'r' denotes a radial displacement of the random locale 'L' from point 'O' at the level of the random locale 'L'. A second coordinate 'y' is then determined from 'h' and 'r', using the equation (1).

$$y=\sqrt{h^2+r^2} \qquad (1).$$

Returning now to FIG. 2, and the consequent discussion, at step 250, a first locale within the geographical region is identified and first GPS coordinates corresponding to the first locale are obtained at the server (150). In accordance with an embodiment, the first GPS coordinates are obtained from the map server (170).

At step 260, first spatial coordinates corresponding to the first locale are calculated, at the server (150) as a function of the reference GPS coordinates, the first GPS coordinates and the spatial coordinate system (300). The first spatial coordinates are then stored in the database (160) from the server (150).

Table 1 shown below, illustrates an exemplary calculation of first spatial coordinates of a locale named 'Menara TM' with 'KL Tower' as a point of reference.

TABLE 1

| Locale | GPS Coordinates (Latitude, Longitude) | Spatial Coordinates (x, y) |
| --- | --- | --- |
| KL Tower. | 3.152778, 101.703333 | 0, 0 |
| Menara TM | 3.116111, 101.666389 | 158.7199303, −0.876152 |

At step 270, the spherical map is displayed at the screen (120) of the computing device (110). In accordance with an embodiment of the present invention, the spherical map is fetched from the database (160), through the server (150), and displayed at the screen (120).

At step 280, the first locale is indicated on the spherical map at the screen (120) of the computing device (110), by means of a first token. In accordance with an embodiment, the first spatial coordinates are fetched from the database (160), through the server (150), and a pin is dropped at a point defined by the first spatial coordinates, thus indicating the first locale on the spherical map.

At step 290, content data corresponding to the first locale is displayed to the user, on selection of the first token. Further, the first token is selected by the user using the input device (130). In accordance with an embodiment, the content data is fetched from the database (160), through the server (150) and displayed at the screen (120).

In accordance with an embodiment of the present invention, the content data comprises at least one of a plurality of two dimensional images, a plurality of spherical images, a plurality of videos and data in textual form. For example, in accordance with an embodiment, the first locale is a historical monument, when the user selects the first token, historical information in textual or video format will be displayed at the screen (120) of the computing device (110). In another example, the first locale is a stock exchange. When the user selects the first token, a ticker is displayed at the screen (120), showing the current rates of the shares. In accordance with another embodiment, the first locale represents a business entity. The business entity is able to advertise its business using the plurality of two dimensional images, the plurality of videos and the plurality of spherical images. The business entity may be one of, but not limited to, travel services, entertainment, healthcare services and pest control services etc.

In accordance with an embodiment, the content data is in accordance with the first GPS coordinates corresponding to the first locale. For example, the user may be interested in a coffee shop. Hence, a plurality of coffee shops in close proximity of the user is displayed at the screen (120). Further, details of the plurality of coffee shops, such as name, address and menu cards are also displayed at the screen (120). In another example, the user is interested in finding a housekeeping service. Hence, a plurality of business offering housekeeping services near the location of the user will be displayed at the screen (120).

In accordance with an embodiment of the present invention, input data is received from the user and the content data is modified as a function of the input data. In accordance with an embodiment, the input data comprises statistics of a plurality of interactions with the user and demographics of the user. Further, the statistics and the demographics are collected using the computing device (110). The input data is analysed and the content data is modified in accordance with the user preferences. For example, the user frequently visits an eating join, E1. When the user, searches the interactive location service for eating joints, E1 is displayed first in the list. In another example, the user is of Chinese origin. When the user searches the interactive location service for book stores, a book store with maximum Chinese publications is displayed to the user. In yet another example, the user is a student of architecture, when the user searches for a building, the architectural details of the building are also displayed along with the first token.

In accordance with an embodiment, the content data is displayed along with the first locale on a two dimensional map provided by the map server (170). For example, if the first locale is a beach, the user may be able to view the content data corresponding to the beach on the two dimensional map provided by the map server (170). Further, the content data comprises a plurality of spherical images and data in textual format corresponding to the beach.

In accordance with an embodiment, the content data is provided by the user to one or more second users through a social media platform hosted by the social media server (180). For example, the first locale is a national park and the content data comprises a plurality of two dimensional images and a plurality of videos corresponding to the national park. The user may share the plurality of two dimensional images and the plurality of videos through the social media platform hosted by the social media server (180) to the one or more second users. The one or more second users may then be able to view the plurality of images and videos and be redirected to the interactive location service, thus increasing web traffic of the interactive location service. In another example, the user may wish to refer a yoga studio to the one or more second users. The user will be able to share the address and reviews of the yoga studio through the social media platform to the one or more second users. Further, the user will also be able to share a plurality of two dimensional images and videos corresponding to yoga and benefits of yoga with one or more second users.

In accordance with an embodiment, one or more authentication credentials are obtained from the user. Further, the content data is regulated on the basis of the one or more authentication credentials. In accordance with an embodiment, the one or more authentication credentials comprise at least one of a user identifier and a password. Further, the user identifier and the password are created when the user registers for the interactive location service. Also, in accordance with an embodiment, the user is given a complete access or a partial access to the content data in accordance with the one or more authentication credentials. The one or more authentication credentials may vary as per, but not limited to, location and nationality of the user and/or payment made by the user for the interactive location service. For example, the user may have obtained partial membership of the interactive location service, hence only partial access to the content data is provided to the user.

In accordance with an embodiment of the present invention, an e-commerce medium is provided at the screen (120) on selection of the first token. The e-commerce medium facilitates a plurality of transactions to be made by the user. The plurality of transactions comprise, but are not limited to, a hotel room booking, an airline ticket booking, a travel tour ticket purchase, a tourist attraction admission ticket purchase, a purchase of a furniture item, a purchase of prescription drugs and obtaining a weather forecast for the geographical region for a period specified by the user etc. The e-commerce medium is explained in further details in following discussion by means of a plurality of illustrations.

In accordance with an embodiment of the present invention, the user may wish to display a second locale of user's choice at the spherical map. Displaying of the second locale at the spherical map allows the user to determine a travel route from the first locale to the second locale. Further, the user also is able to determine time required for travelling from the first locale to the second locale. For enabling display of the second locale at the spherical map, second GPS coordinates corresponding to the second locale are received from the user at the server (150), using the computing device (110). Further, second spatial coordinates corresponding to the second locale are calculated at the server (150). Further, the second spatial coordinates are calculated as a function of the reference GPS coordinates, the second GPS coordinates and the spatial coordinate system. Further, the second locale is indicated on the spherical map by means of a second token, at the screen (120) of the computing device (110).

Figure 4:
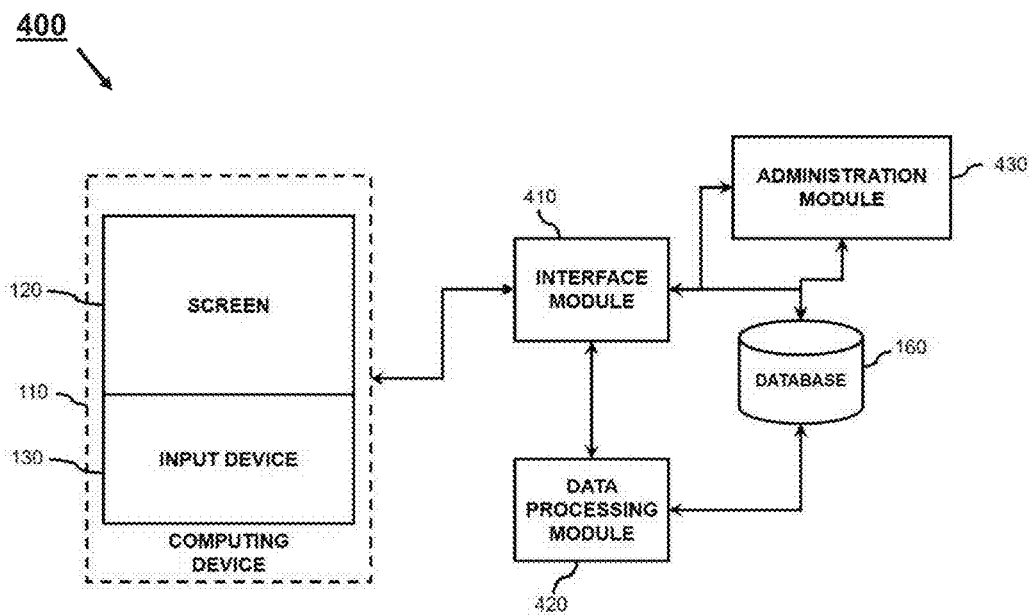
FIG. 4 illustrates a system for providing an interactive location service to a user in accordance with an embodiment of the present invention.

FIG. 4 illustrates a system (400) for providing an interactive location service to a user, in accordance with an embodiment of the present invention. As shown in FIG. 4, the system for providing the interactive location service to the user comprises an interface module (410), a data processing module (420) and a database (160). The interface module (410) is configured to obtain a spherical map of a geographical region at the server (150). In accordance with an embodiment, the spherical map is obtained through the network (140). Further, the spherical map is obtained from, but not limited to, a plurality of HTML/WebGL libraries.

In accordance with another embodiment, a plurality of two dimensional images corresponding to the geographical region is obtained at the server (150). The plurality of two dimensional images is then stitched to obtain the spherical map. Preferably, the plurality of two dimensional images is obtained from a camera device. Alternately, the plurality of two dimensional images are obtained from the map server (170), and captured at varying altitudes and/or resolutions etc. The plurality of two dimensional images are then stitched together to obtain the spherical map. In any case, the spherical map is stored in the database (160) from the server (150), by the interface module (410).

Further, the data processing module (420) is configured to identify a point of reference within the geographical region, from the spherical map, at the server (150). In accordance with an embodiment, the point of reference is a position at which the camera device is placed for taking the plurality of two dimensional images of the geographical region. Further, the data processing module (420) is configured to obtain reference Global Positioning System (GPS) coordinates corresponding to the point of reference, from the map server (170). The reference GPS coordinates are obtained at the server (150) and stored in the database (160). The reference GPS coordinates comprise a longitude value and a latitude value corresponding to the point of reference.

Further, the data processing module (420) is configured to define the spatial coordinate system (300) with the point of reference as the origin of the spatial coordinate system (300), at the server (150). A plurality of attributes corresponding to the spatial coordinate system (300) are then stored in the database (160) by the data processing module (420). Further, the data processing module (420) is configured to identify a first locale within the geographical region and obtain first GPS coordinates corresponding to the first locale, at the server (150). In accordance with an embodiment, the first GPS coordinates are obtained from the map server (170), by the interface module (410) and provided to the data processing module (420).

Further, the data processing module (420) is configured to calculate first spatial coordinates corresponding to the first locale as a function of the reference GPS coordinates, the first GPS coordinates and the spatial coordinate system (300), at the server (150). The first spatial coordinates are then stored in the database (160) by the data processing module (420). Further, the interface module (410) is configured to display the spherical map at the screen (120) of the computing device (110). In accordance with an embodiment of the present invention, the interface module (410) fetches the spherical map from the database (160), through the server (150), and displays it at the screen (120).

Further, the interface module (410), indicate a first locale on the spherical map at the screen (120) of the computing device (110), by means of a first token. In accordance with an embodiment, the interface module (410) fetches the first spatial coordinates from the database (160), through the server (150), and drops a pin at a point defined by the first spatial coordinates, thus indicating the first locale on the spherical map. Also, the interface module (410) is configured to display content data corresponding to the first locale to the user, on selection of the first token. Further, the first token is selected by the user using the input device (130). In accordance with an embodiment, the interface module (410) fetches the content data from the database (160), through the server (150) and displays the content data at the screen (120). Further, the database (160) is configured to store the reference GPS coordinates, the first GPS coordinates, the first spatial coordinates and the content data.

In accordance with an embodiment of the present invention, the interface module (410) is further configured to receive input data from the user and the data processing module (420) is further configured to modify the content data as a function of the input data. In accordance with an embodiment, the input data comprises statistics of a plurality of interactions with the user and demographics of the user. Further, the statistics and the demographics are collected using the computing device (110). The input data is analysed and the content data is modified in accordance with the user preferences. For example, the user frequently visits an eating join, E1. When the user, searches the interactive location service for eating joints, E1 is displayed first in the list. In another example, the user is of Chinese origin. When the user searches the interactive location service for book stores, a book store with maximum Chinese publications is displayed to the user. In yet another example, the user is a student of architecture, when the user searches for a building, the architectural details of the building are also displayed along with the first token.

In accordance with an embodiment of the present invention, the interface module (410) is further configured to display the content data along with the first locale on a two dimensional map provided by the map server (170). For example, if the first locale is a beach, the user may be able to view the content data corresponding to the beach on the two dimensional map provided by the map server (170). Further, the content data comprises a plurality of spherical images and data in textual format corresponding to the beach.

In accordance with an embodiment of the present invention, the interface module (410) is further configured to provide the content data through a social media platform hosted by the social media server (180) to one or more second users. For example, the first locale is a national park and the content data comprises a plurality of two dimensional images and a plurality of videos corresponding to the national park. The user may share the plurality of two dimensional images and the plurality of videos through the social media platform hosted by the social media server (180) to the one or more second users. The one or more second users may then be able to view the plurality of images and videos and be redirected to the interactive location service, thus increasing web traffic of the interactive location service. In another example, the user may be interested in receiving an opinion for an apartment, which the user wishes to purchase, in a building complex. The user will be able to share the interiors of the apartment through the social media platform with one or more second users. The one or more second users will then be able to post their opinions through the social media platform.

In accordance with an embodiment of the present invention, the system (400) further comprises an administration module (430) configured to regulate the content data on the basis of one or more authentication credentials of the user. Also, the interface module (410) is further configured to receive the one or more authentication credentials from the user and the database (160) is further configured to store the one or more authentication credentials. In accordance with an embodiment, the one or more authentication credentials comprise at least one of a user identifier and a password.

Further, the user identifier and the password are created when the user registers for the interactive location service. Also, in accordance with an embodiment, the user is given a complete access or a partial access to the content data in accordance with the one or more authentication credentials. The one or more authentication credentials may vary as per, but not limited to, location and nationality of the user and/or payment made by the user for the interactive location service. For example, the user may have obtained partial membership of the interactive location service, hence only partial access to the content data is provided to the user.

In accordance with an embodiment of the present invention, the interface module (410) is further configured to provide an e-commerce medium on selection of the first token, at the screen (120) of the computing device (110). The e-commerce medium facilitates a plurality of transactions to be made by the user. The plurality of transactions comprise, but are not limited to, a hotel room booking, an airline ticket booking, a travel tour ticket purchase a tourist attraction admission ticket purchase, a booking of a cab, a booking of an appointment with a yoga studio, an ordering of housekeeping service and an advanced payment for an appointment with a medical practitioner etc. The e-commerce medium is explained in further details in following discussion by means of a plurality of illustrations.

In accordance with an embodiment of the present invention, the user may wish to display a second locale of user's choice at the spherical map. Displaying of the second locale at the spherical map allows the user to determine a travel route from the first locale to the second locale. Further, the user also is able to determine time required for travelling from the first locale to the second locale. For enabling display of the second locale at the spherical map, the interface module (410) is configured to receive second GPS coordinates corresponding to a second locale from the user, at the server (150), using the computing device (110).

Further, the data processing module (420) is further configured to calculate second spatial coordinates corresponding to the second locale as a function of the reference GPS coordinates, the second GPS coordinates and the spatial coordinate system (300). Further, second spatial coordinates corresponding to the second locale are calculated at the server (150). Further, the interface module (410) is configured to indicate the second locale on the spherical map at the screen (120) of the computing device (110), by means of a second token. Also, database (160) is further configured to store the second spatial coordinates.

Figure 5:
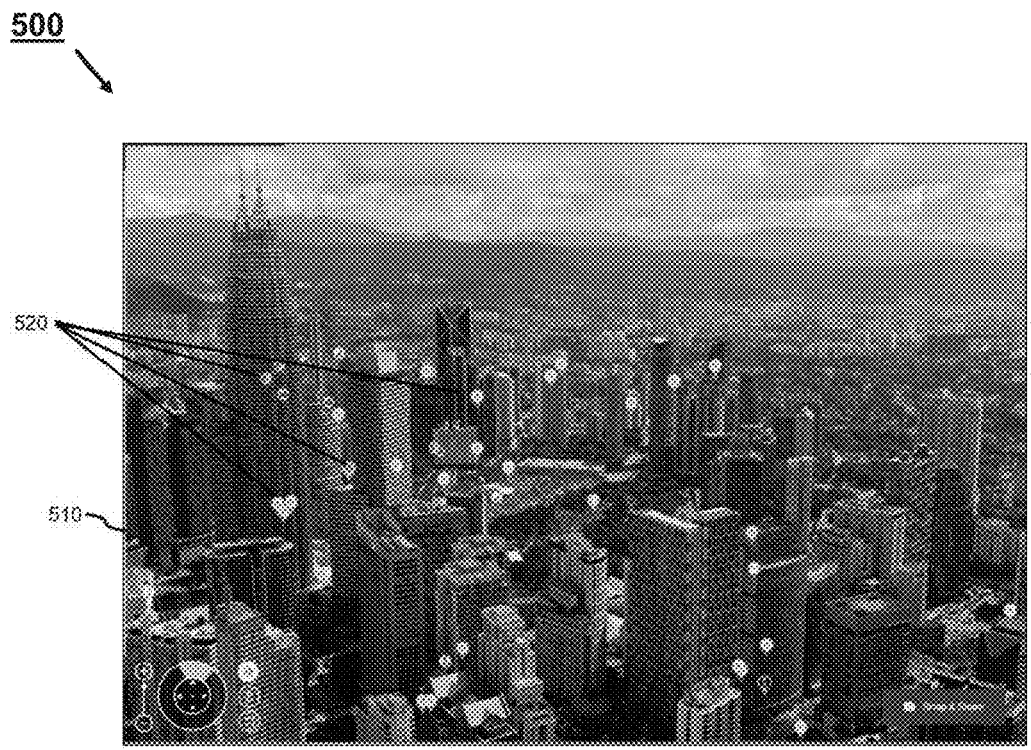
FIG. 5 illustrates a spherical map displaying a plurality of first locales, in accordance with an exemplary embodiment of the present invention.
Figure 6:
FIG. 6 illustrates a first locale by means of a first token, in accordance with another exemplary embodiment of the present invention.
Figure 7:
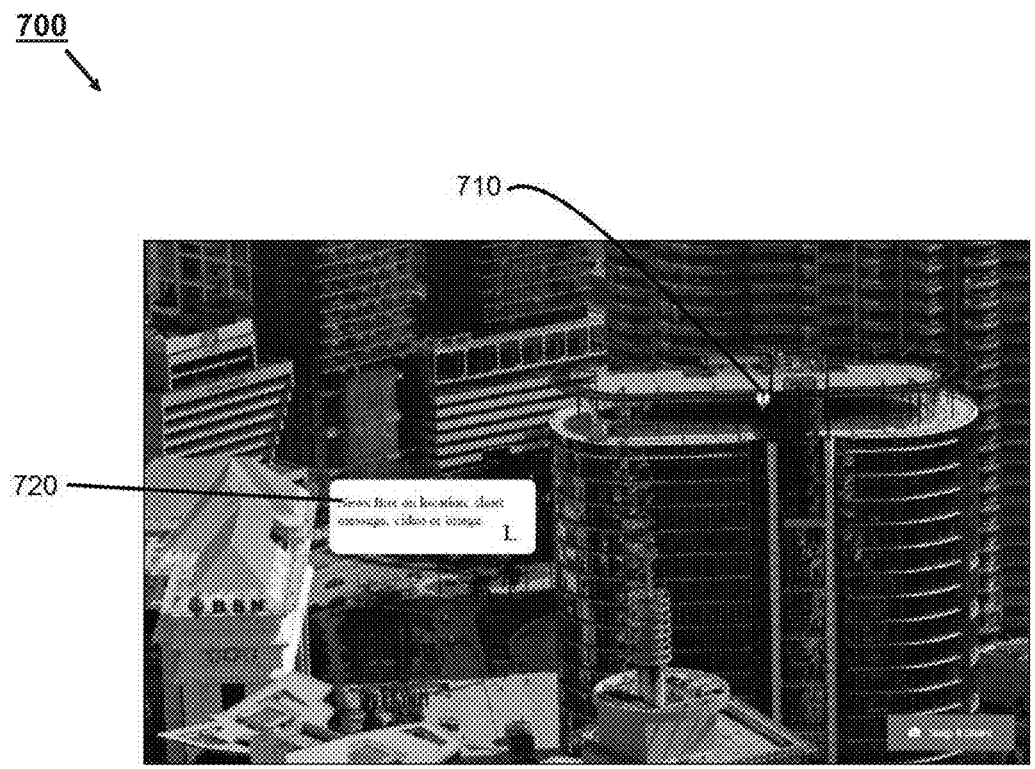
FIG. 7 illustrates a first locale by means of a first token, in accordance with yet another exemplary embodiment of the present invention.

The embodiments described above will now be detailed by means for following exemplary embodiments. FIG. 5 illustrates a spherical map (510) displaying a plurality of first locales (520), in accordance with an exemplary embodiment (500) of the present invention. FIG. 6 illustrates a first locale (Kula Lumpur Railway Station in FIG. 6) by means of a first token (610), in accordance with another exemplary embodiment (600) of the present invention. Also, content data (620) in textual format is illustrated. FIG. 7 illustrates a first locale by means of a first token (710), in accordance with yet another exemplary embodiment (700) of the present invention. Also, content data (720) comprising news in textual, two dimensional image or video format is illustrated.

Figure 8:
FIG. 8 illustrates a plurality of first locales being displayed on a two dimensional map provided by a map server, in accordance with yet another exemplary embodiment of the present invention.
Figure 9:
FIG. 9 illustrates a spherical map of a theme park displaying an e-commerce medium, in accordance with yet another exemplary embodiment of the present invention.
Figure 10:
FIG. 10 illustrates a spherical map of a resort displaying an e-commerce medium, in accordance with yet another exemplary embodiment of the present invention.

FIG. 8 illustrates a plurality of first locales (820) being displayed at a two dimensional map (810) provided by the map server (170), in accordance with yet another exemplary embodiment (800) of the present invention. FIG. 9 illustrates a spherical map (910) of a theme park displaying an e-commerce medium (920), in accordance with yet another exemplary embodiment (900) of the present invention. As shown in the FIG. 9, the e-commerce medium (920) allows the user to purchase tickets for the theme park. FIG. 10 illustrates a spherical map (1010) of a resort displaying an e-commerce medium (1020), in accordance with yet another exemplary embodiment (1000) of the present invention. As shown in the FIG. 10, the e-commerce medium (1020) allows the user to book a room in the resort.

Figure 11:
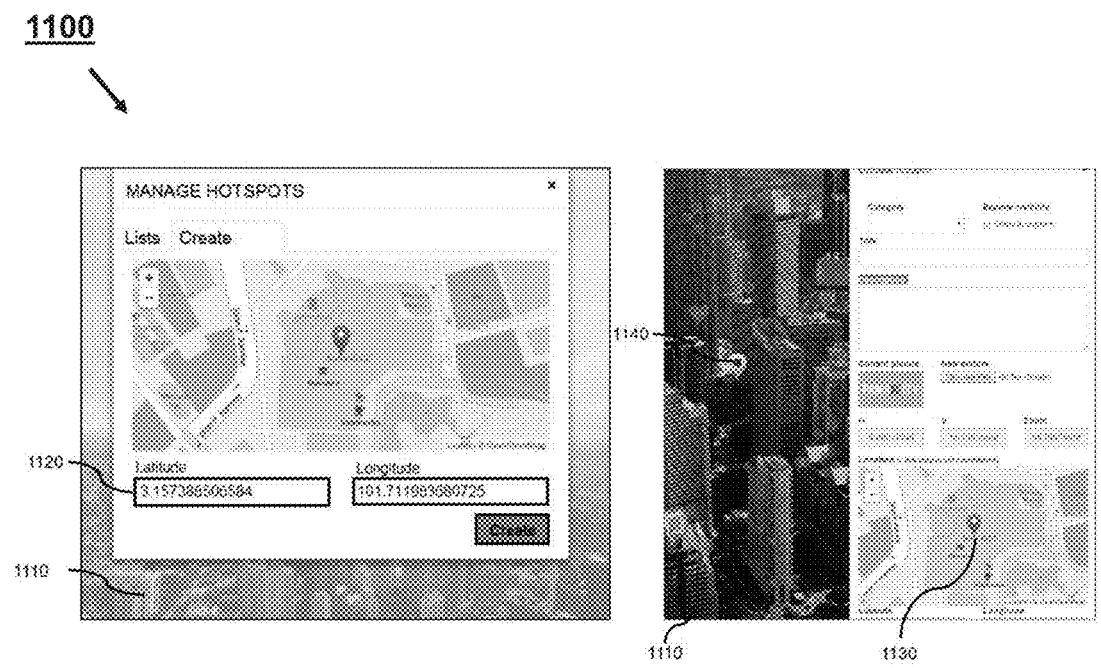
FIG. 11 illustrates an exemplary embodiment of the method for displaying a second locale within a geographical region, using a computing device.

FIG. 11 illustrates an exemplary embodiment (1100) of the method for displaying a second locale (1130) within a geographical region, using the computing device (110). As shown in the FIG. 11, a spherical map (1110) is being displayed on screen (120) of the computing device (110). When a user enters second GPS coordinates (1120) corresponding to the second locale (1130), the second locale (1130) is indicated on the spherical map (1110) by means of a second token (1140).

The method and system for providing an interactive location service to a user, as described above offer a plurality of advantages. Such as, it provides a centralized platform for all the information pertaining to a geographical region. Further, the invention, when applied to tourism industry, allows the user to efficiently plan an itinerary for visiting a geographical region. Further, the invention allows business entities to advertise their products and services to the user, in an interactive manner. Further, the invention can be extended to a plurality of fields of business, such as, but not limited to, news reporting, financial services, legal services, domestic services, weather services and healthcare services etc. Also, the invention enables to display a second locale on a spherical map of the geographical region, with GPS coordinates of the second locale. Further, the method allows calculation of distance between the first locale and the second locale and estimation of transit time between the two locales.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistency with the principles and the novel and inventive features disclosed or suggested herein. Accordingly, the invention is anticipated to hold on to all other such alternatives, modifications, and variations that fall within the scope of the present invention and appended claim.

The invention claimed is:

1. A method (200) for providing an interactive location service to a user through a computing device (110), the method comprising the steps of:
   obtaining (210) a spherical map of a geographical region;
   identifying (220) a point of reference within said geographical region, from said spherical map;
   obtaining (230) reference Global Positioning System (GPS) coordinates corresponding to said point of reference;
   defining (240) a spatial coordinate system with said point of reference as an origin of said spatial coordinate system;
   identifying (250) a first locale within said geographical region and obtaining first GPS coordinates corresponding to said first locale;
   calculating (260) first spatial coordinates corresponding to said first locale as a function of said reference GPS coordinates, said first GPS coordinates and said spatial coordinate system;
   displaying (270) said spherical map at a screen (120) of said computing device (110);
   indicating (280) said first locale on said spherical map at said screen (120) of said computing device (110), by means of a first token; and
   displaying (290) content data corresponding to said first locale to said user, on selection of said first token.

2. The method (200) as claimed in claim 1, wherein said content data comprises at least one of a plurality of two dimensional images, a plurality of spherical images, a plurality of videos and data in textual form.

3. The method (200) as claimed in claim 1, wherein said content data is in accordance with said first GPS coordinates corresponding to said first locale.

4. The method (200) as claimed in claim 1, further comprising the step of receiving input data from said user and modifying said content data as a function of said input data.

5. The method (200) as claimed in claim 1, further comprising the step of displaying said content data along with said first locale on a two dimensional map provided by a map server (170).

6. The method (200) as claimed in claim 1, further comprising the step of providing said content data through a social media platform to one or more second users.

7. The method (200) as claimed in claim 1, further comprising the step of receiving one or more authentication credentials from said user, wherein said content data is regulated on the basis of said one or more authentication credentials.

8. The method (200) as claimed in claim 7, wherein said one or more authentication credentials comprise at least one of a user identifier and a password.

9. The method (200) as claimed in claim 1, further comprising the step of providing an e-commerce medium on selection of said token.

10. The method (200) as claimed in claim 1, further comprising the steps of:
    receiving second GPS coordinates corresponding to a second locale from said user;
    calculating second spatial coordinates corresponding to said second locale as a function of said reference GPS coordinates, said second GPS coordinates and said spatial coordinate system; and
    indicating said second locale on said spherical map at said screen (120) of said computing device (110), by means of a second token.

11. A system (400) for providing an interactive location service to a user, through a computing device (110), the system (400) comprising:
    an interface module (410);
    a data processing module (420); and
    a database (160);
    wherein said interface module (410) is configured to:
      obtain a spherical map of a geographical region;
      display said spherical map at a screen (120) of said computing device (110);
      indicate a first locale on said spherical map at said screen (120) of said computing device (110), by means of a first token; and
      display content data corresponding to said first locale to said user, on selection of said first token;
    wherein said data processing module (420) is configured to:
      identify a point of reference within said geographical region, from said spherical map;
      obtain reference Global Positioning System (GPS) coordinates corresponding to said point of reference;
      define a spatial coordinate system with said point of reference as an origin of said spatial coordinate system;
      identify said first locale within said geographical region and obtain first GPS coordinates corresponding to said first locale; and
      calculate first spatial coordinates corresponding to said first locale as a function of said reference GPS coordinates, said first GPS coordinates and said spatial coordinate system;
    wherein said database (160) is configured to:
      store said reference GPS coordinates, said first GPS coordinates, said first spatial coordinates and said content data.

12. The system (400) as claimed in claim 11, wherein said interface module (410) is further configured to receive input data from said user and said data processing module (420) is further configured to modify said content data as a function of said input data.

13. The system (400) as claimed in claim 11, wherein said interface module (410) is further configured to display said content data along with said locale on a two dimensional map provided by a map server (170).

14. The system (400) as claimed in claim 11, wherein said interface module (410) is further configured to provide said content data through a social media platform to one or more second users.

15. The system (400) as claimed in claim 11, further comprising an administration module (430) configured to regulate said content data on the basis of one or more authentication credentials of said user, wherein said interface module (410) is further configured to receive said one or more authentication credentials from said user and said database (160) is further configured to store said one or more authentication credentials.

16. The system (400) as claimed in claim 15, wherein said one or more authentication credentials comprise at least one of a user identifier and a password.

17. The system (400) as claimed in claim 11, wherein said interface module (410) is further configured to provide an e-commerce medium on selection of said token.

18. The system (400) as claimed in claim 11, wherein said interface module (410) is further configured to:
  receive second GPS coordinates corresponding to a second locale from said user; and
  indicate said second locale on said spherical map at said screen (120) of said computing device (110), by means of a second token;
  wherein said data processing module (420) is further configured to:
  calculate second spatial coordinates corresponding to said second locale as a function of said reference GPS coordinates, said second GPS coordinates and said spatial coordinate system; and
  wherein said database (160) is further configured to:
  store said second spatial coordinates.

* * * * *